United States Patent Office 3,634,265
Patented Jan. 11, 1972

3,634,265
SKIN CLEANER REQUIRING NO ADDITION OF
WATER FOR CLEANING THEREWITH
George J. Merritt, Sudbury, Mass., assignor to the United
States of America as represented by the Secretary of
the Army
No Drawing. Filed Nov. 27, 1968, Ser. No. 779,654
Int. Cl. C11d 9/30, 9/50
U.S. Cl. 252—107                                    1 Claim

ABSTRACT OF THE DISCLOSURE

A skin cleaner emulsion having fast liquefying qualities when massaged upon the skin and adapted to be used without the addition of water, comprising a liquid isoparaffinic hydrocarbon solvent, a light mineral oil, the reaction product of a long-chain alkanoic acid with an alkanolamine, an anionic surfactant, a protective colloid, and deionized water. The emulsion may also comprise a humectant, an antimicrobiological agent, and perfume.

The invention described herein may be manufactured, used, and licensed by or for the Government for governmental purposes without the payment to me of any royalty thereon.

This invention relates to a skin cleaner which requires no addition of water for cleaning skin therewith and a process for producing the same. In particular, it is related to a skin cleaner emulsion having fast liquefying qualities when subjected to friction due to rubbing action on the skin, yet is very stable to extremes of heat or cold during storage thereof.

So-called "waterless skin cleaners" are known and sold commercially, particularly for use by industrial workers and mechanics. A number of these products perform well in terms of cleaning action; but they have the disadvantage of being unstable in storage, the emulsions being very susceptible to breakdown when exposed to high or low temperature storage conditions. Such products are unsuitable for military purposes since the Armed Forces are frequently required to operate under extreme climatic conditions and the storage and transportation of supplies are likewise carried out under such climatic conditions. Hence, the development of a skin cleaner requiring no addition of water for cleaning therewith and possessing high stability at abnormally low and high temperatures was needed by the military services.

It is, therefore, an object of this invention to provide a skin cleaner composition which does not require the addition of water for use in cleaning skin therewith, the composition being very stable at high and low ambient temperatures, and being capable of rapidly liquefying when subjected to massaging action so that the solvent, emulsifier and other ingredients thereof effectively carry out their cleansing action on the skin.

Another object of this invention is to provide a process for the production of a skin cleaner having the above-described attributes.

Other objects and advantages will appear from the following description of an example of the invention, and the novel features of the invention will be particularly pointed out in connection with the appended claim.

The objects of the invention are carried out by forming an oil portion and an aqueous portion, then gradually adding the aqueous portion to the oil portion with thorough mixing. The oil portion comprises a liquid isoparaffinic hydrocarbon solvent for skin contaminants, a light mineral oil, and a long-chain alkanoic acid. It may also comprise a humectant and an anti-microbiological agent, such as a germicide or fungicide. The aqueous portion comprises an alkanolamine, an anionic surfactant, a protective colloid, and deionized water. If a humectant is used, it may be incorporated in the aqueous portion instead of the oil portion. Both the oil portion and the aqueous portion are separately heated sufficiently to dissolve all of the ingredients thereof. As the aqueous portion is added to and thoroughly mixed with the oil portion, a water-in-oil type emulsion is formed initially. However, as the addition and mixing continue, the emulsion inverts, becoming an oil-in-water emulsion. When this occurs, the viscosity of the mixture increases markedly.

The proportions of long-chain alkanoic acid in the oil portion and alkanolamine in the aqueous portion are selected so that they will be substantially stoichiometrically equivalent so that, upon reacting together, they will produce a substantially neutral amine soap. As a result, when all of the aqueous portion is thoroughly mixed with the oil portion, the resulting emulsion has a pH of from about 5.0 to about 8.0 and preferably will be as nearly neutral as possible, i.e. it will have a pH as near 7.0 as is practicable. The alkanolamine reacts with the long-chain alkanoic acid practically instantaneously upon contact. Hence, the mixing can be stopped very soon after all of the aqueous portion has become thoroughly mixed with the oil portion or with the oil-in-water emulsion formed by the mixing of the aqueous portion with the oil portion, as described above.

While it is not intended that the process of this invention be limited to adding the aqueous portion to the oil portion, going through the formation of a water-in-oil emulsion first, followed by the inversion of the emulsion to an oil-in-water type emulsion with further addition and mixing in of the aqueous portion, it is preferred to mix the separate portions in this manner in order to produce the finest possible particle size in the final emulsion. Then under the influence of the anionic surfactant and the protective colloid the emulsion becomes extremely stable against breakdown under high or low temperature conditions. Nevertheless, the emulsion is subjected to liquefaction by shearing action, as occurs when a skin cleaner is rubbed or massaged on grimy hands. Thus, under such treatment, the skin cleaner emulsion liquefies, permitting intimate contact of the emulsion with the skin contaminants so that the latter will be dissolved or dispersed in the skin cleaner emulsion. The liquid skin cleaner emulsion carrying the contaminants dispersed therein is then wiped off with a towel, no additional water being required in the skin cleansing operation.

A suitable form and source of the liquid isoparaffinic hydrocarbon solvent is "Isopar H," a product of Humble Oil & Refining Co. A suitable form and source of the light mineral oil is "Paraffin Oil N.F.—Viscosity 125/135," a product marketed by Fisher Scientific Co., Fair Lawn, N.J. Liquid petrolatum may also be used as the light mineral oil. A suitable long-chain alkanoic acid is stearic acid and a suitable form thereof is "Neo Fat 18, Flaked," a product of Armor Industrial Chemical Co. Other long-chain alkanoic acids which may be used are alkanoic acids having from 10 to 30 carbon atoms, e.g. palmitic acid, margaric acid, arachidic acid, behenic acid, lignoceric acid, cerotic acid, and melissic acid.

A suitable alkanolamine is a mixture of isopropanolamines produced and marketed by Union Carbide Chemical Corporation as "Mixed Isopropanolamine." However, other alkanolamines may be used, e.g. monoisopropanolamine, diisopropanolamine, triisopropanolamine, monoethanolamine, diethanolamine, and triethanolamine. The purpose of the alkanolamine is to combine with the long-chain alkanoic acid to form an amine soap which serves as an emulsifier, assisting the isoparaffinic hydrocarbon and mineral oil solvent mixture in removing grease, oil, and other contaminants from the skin. A suitable anionic surfactant is sodium tetradecyl sulphate, which is produced and marketed by Union Carbide Chemical Corporation under the trade name "Tergitol Anionic 4." Other anionic surfactants which may be used are sodium heptadecyl sulphate ("Tergitol Anionic 7") and sodium 2-ethylhexyl sulphate ("Tergitol Anionic 08") both produced by Union Carbide Chemical Corporation. The anionic surfactant assists in the skin cleansing action of the skin cleaner emulsion by effecting adequate wetting of the skin by the emulsion. The anionic surfactant also assist in maintaining a stable emulsion by helping to keep the particles of amine soap apart and the antimicrobiological agent dispersed in the emulsion. The protective colloid, polyvinylpyrrolidine also plays a very important part in maintaining a stable emulsion at both high and low temperatures. A suitable source of polyvinylpyrrolidine is "PVP–K30," a product of General Aniline & Film Corporation. The water employed in making the emulsion may be deionized by distillation, ion exhange, or any other method for preparing deionized water. It is important that the water be deionized in order to maintain the highest stability of the emulsion at high and low temperatures since water containing minerals would tend to overcome or diminish the stabilizing effects of the anionic surfactant and the protective colloid, particularly at extremely high or low storage temperatures.

In addition to the above-mentioned essential ingredients of the skin cleaner emulsion, the emulsion may comprise a humectant, of which glycerine is an example and is preferred for this purpose. As previously noted, the humectant may be added to either the oil portion or the aqueous portion of the emulsion. A suitable source of glycerine is 99.5% U.S.P. Glycerine, a product of Atlas Chemical Industries, Inc. However, other humectants may be used, such as propylene glycol and sorbitol. Other optional ingredients may include an antimicrobiological agent, such as hexachlorophene (a gram-positive bactericide), or other germicidds or fungicides in certain instances. The emulsion may also include a perfume. The optional ingredients may be incorporated in the portions in which they are more soluble.

The best results are obtained with respect to both stability of the emulsion under extreme climatic conditions and effectiveness of the cleaning action on the skin by the emulsion when the proportions of the several ingredients of the emulsion are within certain ranges. The following table shows the ranges of the ingredients employed in making highly stable skin cleaner emulsions in accordance with the present invention:

TABLE 1

|  | Parts by wt. |
| --- | --- |
| Liquid isoparaffinic hydrocarbon | 30.0–32.0 |
| Light mineral oil | 15.2–16.2 |
| Alakanoic acid | 7.8–8.2 |
| Humectant | 2.9–3.1 |
| Antimicrobiological agent | 0.45–0.55 |
| Deionized water | 35.0–37.0 |
| Alkanolamine | 3.9–4.1 |
| Anionic surfactant | 0.95–1.05 |
| Protective colloid | 0.75–0.85 |

The following example illustrates the method of carrying out the present invention and the skin cleaner emulsion produced thereby.

EXAMPLE

An oil portion was prepared by mixing 31.0 parts by weight of an isoparaffinic hydrocarbon marketed under the trade name "Isopar H" by Humble Oil & Refining Co., 15.7 parts of a light mineral oil known as "Paraffin Oil N.F.–Viscosity 125/135," marketed by Fisher Scientific Co., 8.0 parts of stearic acid known as "Neo Fat 18, Flaked," marketed by Armour Industrial Chemical Company, 3.0 parts of glycerine, 99.5% U.S.P. marketed by Atlas Chemical Industries, Inc., and 0.5 part of hexachlorophene marketed as "G–11" by Sindar Corporation. The oil portion was heated to 75° C. to insure that all of the ingredients were dissolved.

An aqueous portion was prepared by mixing 4.0 parts by weight of Mixed Isopropanolamine marketed by Union Carbide Chemical Corporation, 1.0 part of sodium tetradecyl sulphate marketed under the tradename "Tergitol Anionic 4" by Union Carbide Chemical Corporation, 0.8 part of polyvinylpyrrolidine marketed as "PVP–K30" by General Aniline & Film Corporation in 36.0 parts of distilled water. The aqueous portion was heated to 55° C. to insure that all of the ingredients were dissolved.

The aqueous portion was gradually added to the oil portion with stirring to effect thorough mixing of the aqueous and oil portions. At first, the mixture was relatively non-viscous. However, at a certain stage in the mixing the emulsion formed inverted from a water-in-oil type to an oil-in-water type and the viscosity increased markedly. As soon as all of the aqueous portion was thoroughly mixed into the emulsion, stirring was stopped. The resulting emulsion was a smooth, homogeneous, white cream having a pH of 6.9. When spread on the back surfaces of hands soiled with a mixture prepared by mixing 1 quart S.A.E. #30 lubricating oil, 0.5 lb. of lime grease, 4 oz. of carbon lamp black, and 6 oz. of charcoal black and briskly rubbed over the soiled skin area, the emulsion liqueed and loosened the soiling mixture from the skin. It was easily wiped off of the skin with a paper towel, no water being required for cleansing the skin other than that which was a part of the skin cleaner emulsion. Substantially all of the soiling mixture was removed from the skin in this manner.

A sample of the skin cleaner emulsion was stored for 18 hours at −40° F., then permitted to thaw at room temperature (70° F.). The sample was subjected to the same freezing and thawing cycle five times. There was no indication of separation or breakdown of the emulsion after the five freeze-thaw cycles. The same sample, after the five freeze-thaw cycles, was exposed to a temperature of 160° F. for four hours, then cooled to room temperature. This heating and cooling was repeated for five complete cycles, after which no indication of separation or breakdown of the emulsion was observable.

The foregoing example describes the preferred form of the skin cleaner composition of the present invention and the method of making the same. However, it is understood that variations within certain limits, as described above, may be made in the ingredients and proportions thereof incorporated in the emulsion without appreciably diminishing the stability of the resulting emulsion to high or low temperatures or the ability of the emulsions to clean soiled skin without the addition of water other than that which is present in the emulsions. For example, kerosene may be employed as the solvent in the oil portion instead of the mixture of liquid isoparaffinic hydrocarbon and light mineral oil without detracting from the skin cleansing characteristics or the temperature stability of the skin cleaner emulsion; however, kerosene is less desirable as a solvent because of its greater tendency to remove the natural oils from the skin, resulting in occasional cases of dermatitis.

The skin cleaner emulsions of the present invention are very effective in removing contaminants from the skin, especially oily or greasy contaminants which are extremely difficult to remove with soap and water. Additionally, the skin cleaner emulsions are very stable at high and low temperatures, thus being particularly useful to anyone who is required to operate outdoors in the winter or in extremely hot climates and who is dependent on supplies stored in tents or under tarpaulins or under other circumstances which result in very high or very low temperatures within the storage area, as are members of the Armed Forces, outdoorsmen, explorers, campers and others. The skin cleaner emulsions do not dry out the skin excessively as do many skin cleaners sold commercially. Further, additional water over that which is incorporated in the skin cleaner emulsions is not required to carry out a skin cleansing, only an absorbent towel or cloth being needed to remove from the skin substantially all of the liquefied skin cleaner emulsion carrying with it the contaminants which had been adsorbed on the skin.

It will be understood that various changes in the details, materials, and conditions used in preparing the skin cleaner emulsions of this invention, which have been herein described in order to explain the nature of the invention, may be made by those skilled in the art within the principle and scope of the invention as expressed in the appended claims.

I claim:

1. An oil-in-water skin cleaner emulsion which is characterized by being stable when stored at temperatures from about −40° F. to about 160° F., has fast liquefying qualities when massaged on the skin, and is adapted to be used without the addition of water thereto, consisting essentially of:

|  | Parts by wt. |
|---|---|
| Isoparaffinic hydrocarbon which is liquid at room temperature and atmospheric pressure | 31.0 |
| Light mineral oil | 15.7 |
| Stearic acid | 8.0 |
| Hexachlorophene | 0.5 |
| Glycerine | 3.0 |
| Deionized water | 36.0 |
| Mixed isopropanolamine | 4.0 |
| Sodium tetradecyl sulphate | 1.0 |
| Polyvinylpyrrolidone | 0.8 |

References Cited

UNITED STATES PATENTS

| 3,277,013 | 10/1966 | Gianladis | 252—153 |
| 3,304,262 | 2/1967 | Gorey | 252—122 |
| 3,330,731 | 7/1967 | Mehaffey | 424—168 |

OTHER REFERENCES

Beach, W. J., Soap & Sanitary Chemicals, "Waterless Hand Cleaners," June 1957, pp. 43–46 and 109.

Cruse et al., Soap & Chem. Specialties, "Waterless Hand Cleaners," November 1963, pp. 41, 42, 103, 104.

Encke et al., Soap and Chem. Specialties, "Pressure Packaging Waterless Hand Cleaners," February 1967, pp. 63, 64.

Alexander, P., Manufacturing Chemist & Aerosol News, "Water Hand Cleaners," May 1965, pp. 51–53.

Humble Oil and Refining Co., "ISOPAR" Bulletin (Isoparaffinic Solvent), July 1963.

Emulsions and Detergents, Union Carbide Co., 1961, pp. 8, 9, 10, 11, 22 and 67.

Condensed Chem. Dict., Rheinhold Publishing Co., 7th ed., pp. 769, 770.

LEON D. ROSDOL, Primary Examiner

P. E. WILLIS, Assistant Examiner

U.S. Cl. X.R.

252—117, 118, 121, 152, 153, 161